United States Patent
Kelly

(12)
(10) Patent No.: US 6,239,908 B1
(45) Date of Patent: May 29, 2001

(54) COMPACT BINOCULAR IMAGING SYSTEM USING A SINGLE DISPLAY

(76) Inventor: Shawn L. Kelly, 8479 Pine Cove Dr., Commerce Township, MI (US) 48382

( * ) Notice: Subject to any disclaimer, the term of this patent is extended or adjusted under 35 U.S.C. 154(b) by 0 days.

(21) Appl. No.: 09/438,877

(22) Filed: Nov. 12, 1999

Related U.S. Application Data

(60) Provisional application No. 60/107,953, filed on Nov. 12, 1998, and provisional application No. 60/107,959, filed on Nov. 12, 1998.

(51) Int. Cl.$^7$ .......................... G02B 27/02; G02B 27/22; G02B 27/26; H04N 13/04
(52) U.S. Cl. .................. 359/480; 359/464; 359/465; 359/466; 359/629; 348/54; 348/55; 348/57
(58) Field of Search .................................. 359/462, 464, 359/465, 480, 481, 482, 630, 629, 636, 466, 377; 348/54, 55, 56, 57, 58; 345/7, 8, 9

(56) References Cited

U.S. PATENT DOCUMENTS

| | | | |
|---|---|---|---|
| 3,059,519 | 10/1962 | Stanton | 88/1 |
| 3,205,303 | 9/1965 | Bradley | 178/6.8 |
| 3,614,314 | 10/1971 | Rossire | 178/7.88 |
| 3,670,097 | 6/1972 | Jones | 178/6.5 |

(List continued on next page.)

OTHER PUBLICATIONS

Displaytech, Operating Principles; www. displaytech.com/operating–principles.html May 27, 1999.

Displaytech, Shutters; www.displaytech.com/shutters.html Sep. 7, 1999.

Displaytech, Standard Polarization Rotator; www.displaytech.com/rotators.html Oct. 4, 1999.

Displaytech, RGBFASTfilter™; www.displaytech.com/filters.html May 27, 1999.

Displaytech,Drivers; www.displaytech.com/drivers.html May 27, 1999.

Displaytech, SLM Developer Kit; www.displaytech.com/slmdev–kit–specs.html Jul. 13, 1999.

Displaytech, products sales corporate news contact; Tiny Pixels; www.displaytech.com/panels.html.

*Primary Examiner*—Audrey Chang
(74) *Attorney, Agent, or Firm*—Dinnin & Dunn P.C

(57) ABSTRACT

Temporally interlaced first and second sequential pluralities of image frames are displayed and alternately directed along respected first and second optical paths to distinct viewing locations, for example the left and right eyes of a viewer, wherein the image frames of one of the sequential pluralities represent mirror images of the object being imaged. In one aspect, both sets of sequential pluralities of image frames are simultaneously distributed to both optical paths and first and second shutters are controlled in synchronism with the image display so as to display the respective sequential pluralities of image frames only at the corresponding viewing locations. In another aspect, respective first and second sequential pluralities of image frames are switched between the first and second optical paths by synchronously switching the polarization state of the image display and by a polarizing beam splitter.

24 Claims, 2 Drawing Sheets

U.S. PATENT DOCUMENTS

| | | | |
|---|---|---|---|
| 3,770,887 | 11/1973 | Van Buskirk | 178/6.5 |
| 4,021,846 | 5/1977 | Roese | 358/92 |
| 4,424,529 | 1/1984 | Roese et al. | 358/88 |
| 4,480,893 | 11/1984 | Fantone | 350/132 |
| 4,575,722 | 3/1986 | Anderson | 340/783 |
| 4,698,493 | 10/1987 | Fried | 250/204 |
| 4,805,988 | 2/1989 | Dones | 350/137 |
| 4,902,116 | 2/1990 | Ellis | 350/501 |
| 4,924,853 | 5/1990 | Jones, Jr. et al. | 128/6 |
| 5,034,809 | 7/1991 | Katoh | 358/88 |
| 5,035,474 | 7/1991 | Moss et al. | 350/3.7 |
| 5,198,928 | 3/1993 | Chauvin | 359/465 |
| 5,253,108 | 10/1993 | Latham | 359/482 |
| 5,526,184 | 6/1996 | Tokuhashi et al. | 359/630 |
| 5,596,451 | 1/1997 | Handschy et al. | 359/633 |
| 5,751,493 * | 5/1998 | Hur | 359/630 |
| 5,764,417 | 6/1998 | Francois et al. | 359/630 |
| 5,796,373 | 8/1998 | Ming-Yen | 345/6 |
| 5,808,800 | 9/1998 | Handschy et al. | 359/630 |
| 5,900,976 | 5/1999 | Handschy et al. | 359/495 |
| 5,903,395 | 5/1999 | Rallison et al. | 359/630 |
| 5,903,396 | 5/1999 | Rallison | 359/630 |
| 5,912,650 * | 6/1999 | Carollo | 345/7 |
| 5,949,583 | 9/1999 | Rallison et al. | 359/633 |

* cited by examiner

| Sequential Plurality | 1 | 2 | 1 | 2 |
|---|---|---|---|---|
| Image Display 102 | K | ꓘ | K | ꓘ |
| Left Shutter Control 117 | OPEN | CLOSED | OPEN | CLOSED |
| Left Image | K | | K | |
| Right Shutter Control 119 | CLOSED | OPEN | CLOSED | OPEN |
| Right Image | | K | | K |
| | Frame i | Frame i + 1 | Frame i + 2 | Frame i + 3 |

→ Time

COMPACT BINOCULAR IMAGING SYSTEM USING A SINGLE DISPLAY

CROSS-REFERENCE TO RELATED APPLICATIONS

The instant application claims the benefit of prior U.S. Provisional Application Serial No. 60/107,953 filed on Nov. 12, 1998 and incorporated by reference in entirety herein.

The instant application also claims the benefit of prior U.S. Provisional Application Serial No. 60/107,959 filed on Nov. 12, 1998 and incorporated by reference in entirety herein.

TECHNICAL ART

The instant invention generally relates to systems and methods for binocular imaging with a single display, and more particularly to compact systems that incorporate two eye lenses for viewing a single display.

BACKGROUND OF THE INVENTION

Portable electronic imaging systems employing an electronic image display internal to an optical viewing assembly are well known and are generally designed for two primary applications. The most common is the camcorder, comprising a monocular viewfinder to provide a magnified virtual view of the recorded scene. Such viewfinders provide only a limited apparent field of view and a limited exit pupil and eye relief, and further limit viewing to one eye, resulting in an inconvenient configuration for the user and limited utility for other applications. One solution to this problem has been to replace the viewfinder with a larger flat television display. This solution provides comfortable viewing by both eyes with no exit pupil and eye relief restrictions. However, a large display costs and weighs significantly more than the conventional viewfinder, requires a great amount of battery power, and also provides only a limited field of view.

The second common application of optical viewing assemblies in electronic imaging systems is the head mounted display for night vision or virtual reality applications. Typically employing a biocular or binocular optical system to view one or two display panels, such systems generally provide wider fields of view and larger exit pupils than camcorder viewfinders by employing more elaborate and expensive optical systems, larger display panels, or both. However, the greater cost of such systems combined with the limited utility of head mounted displays results in restricted markets and subsequently in restricted development and production resources.

Generally the electronic image display is a relatively expensive part of a binocular electronic imaging system, particular if the imaging system incorporates separate displays for each eye. Accordingly, the cost of such systems may be reduced by utilizing a single electronic image display to display the binocular image to both eyes. Prior art compact optical systems for providing binocular viewing of a single display require an expensive and heavy beamsplitting cube necessary to preserve the orientation of the image to both eyes. Moreover, the position of a beam splitting cube between the two eye-lenses restricts the relative proximity thereof and accordingly limits the ergonomic utility of the optical system.

SUMMARY OF THE INVENTION

The instant invention overcomes the above-noted problems by providing a compact beam-splitter system together with a means for alternately directing sequential images from a single image display to alternate eyes so that each eye sees only its respective correct orientation of the image. In accordance with a simplified optical display system, the views of the single image display from each respective viewing location, i.e. from separate eye positions, are relatively mirror imaged. Accordingly, the image displayed on the single image display when displayed for one viewing location is mirror imaged relative to that which would be displayed at the other viewing location.

In accordance with a first aspect of the instant invention a compact beam splitter system simultaneously directs the image from a single image display to both eyes, whereby a shutter system in synchronism with the display enables alternate eyes to view alternate sequential images that are displayed by the single display. The compact beam splitter system is preferably adapted so that the lengths of separate optical paths from the single display to each eye are equal. Furthermore, the reflectance of the reflective elements are adapted so that respective image intensities seen by each viewing location relative to the intensity of the image at the single display are also preferably equal. In the first aspect of the instant invention, the intensity of the image directed to each viewing location is less than the intensity of the image at the single display because the image is directed simultaneously to both viewing locations. The image generated by the image display comprises first and second sequential pluralities of image frames that are interleaved with one another, wherein the image frames of one of the sequential pluralities is for display to one eye of the viewer, and the image frames of the other of the sequential pluralities is for display to the other eye of the viewer. Accordingly, the separate sequential pluralities of image frames can contain separate stereoscopic views of a given object so as to provide the viewer a three dimensional view of the object being images. Moreover, one of the sequential pluralities of image frames which undergoes an odd number of reflections in the beam splitter system is displayed as a mirror image of the original source image. The light from the image display is distributed between first and second optical paths by a first beam splitter.

The light traveling on the first optical path is transmitted through a second beam splitter, then reflected off a first beam splitter, then reflected off the second beam splitter, and then travels through a first shutter to reach the first viewing location, wherein the first shutter is controlled in synchronism with the image display so as to be open in synchronism with the first sequential plurality of image frames and closed in synchronism with the second sequential plurality of image frames. A first focussing element in the first optical path, for example a first eye-lens, reimages the light from the image display at the first viewing location.

The light traveling on the second optical path is transmitted through the second beam splitter, then transmitted through the first beam splitter, then reflected off a reflector, and then travels through a second shutter to reach the second viewing location, wherein the second shutter is controlled in synchronism with the image display so as to be open in synchronism with the second sequential plurality of image frames and closed in synchronism with the first sequential plurality of image frames. A second focussing element in the second optical path, for example a second eye-lens, reimages the light from the image display at the first viewing location.

In accordance with a second aspect of the instant invention a compact beam splitter system alternately directs alternate sequential images from a single display to alternate eyes, whereby alternate sequential images are coded by the display with alternate polarizations, and the light is distributed between the separate optical paths by a polarizing beam splitter, wherein substantially all of the light of one polarization is distributed to the first optical path, and substantially all of the light of the other polarization is distributed to the second optical path. The second aspect of the instant invention differs from the first aspect by incorporating a polarization controllable image display, and a polarized beam splitter as the first beam splitter. Moreover, the second aspect of the instant invention does not incorporate the first and second shutters that are incorporated in the first aspect of the instant invention. The remaining elements of the first and second aspects of the instant invention are similar.

In accordance with the second aspect of the instant invention, the light from the single display is directed to either one viewing location or another, and is not simultaneously directed to both viewing locations. Accordingly, the second aspect of the instant invention provides for a greater efficiency than the first because more of the light from the display can reach each viewing location.

Accordingly, one object of the instant invention is to provide an improved compact binocular imaging system that incorporates a single display.

A further object of the instant invention is to provide an improved compact binocular imaging system that is relatively inexpensive to produce.

By dividing the image frames into first and second temporally interleaved pluralities of image frames, and by forming the mirror image of one sequential plurality of image frames, the instant invention is able to provide a compact binocular imaging system with relatively few optical components, which provides for reduced size and cost.

These and other objects, features, and advantages of the instant invention will be more fully understood after reading the following detailed description of the preferred embodiment with reference to the accompanying drawings and viewed in accordance with the appended claims.

DETAILED DESCRIPTION OF THE PREFERRED EMBODIMENT(S)

Figures 1, 2:
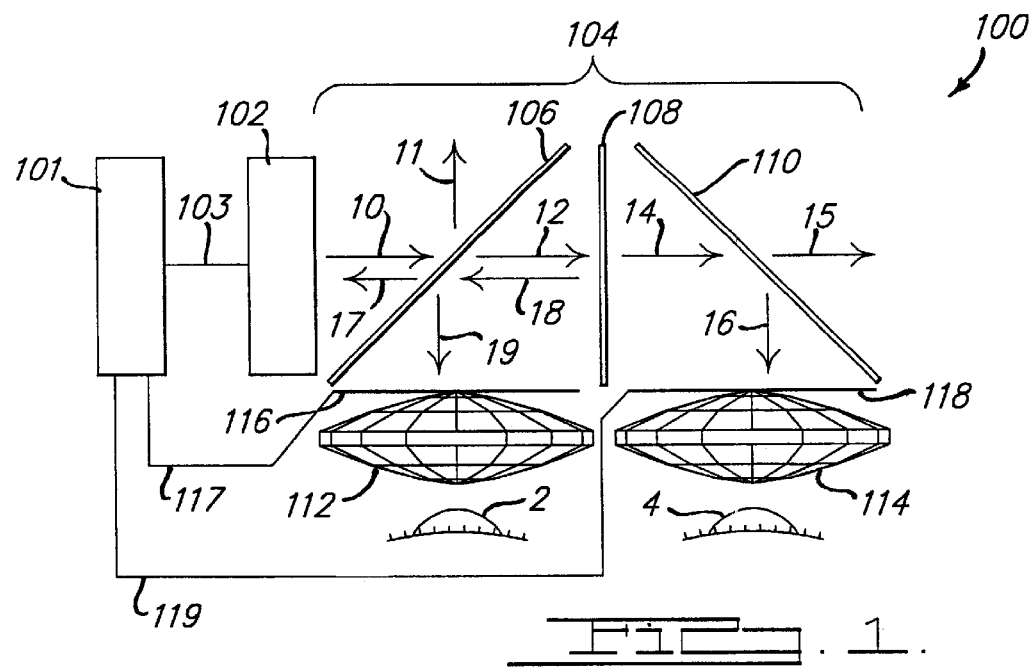
FIG. 1 illustrates a first aspect of the instant invention.
FIG. 2 illustrates the operation of the instant invention.

Referring to FIG. 1, illustrating a first representative embodiment of a first aspect of the instant invention, a compact binocular imaging system 100 comprises an image display 102 disposed proximate a binocular imaging assembly 104 comprising a first, flat beam-splitter 108, a second flat beam-splitter 106, a fold-mirror 110, and two eye-lenses 112 and 114 each proximate a respective shutter 116 and 118. The beam splitters 106 and 108 are for example 50% reflective/transmissive windows and the fold-mirror 110 is for example 50% reflective, ensuring that the amount of light reaching each eye 2 and 4 is equal. In operation, the right shutter 118 proximate the right eye-lens 114 blocks the light from the image display 102 corresponding to an image intended for the left eye 2. At a rate appropriate to avoid perceived flicker, the image display 102 then switches to the image for the right eye 4 at the same time the right shutter 118 opens and the left shutter 116 closes. The alternating images on the image display 102 are reversed in left to right orientation so that each eye 2 and 4 sees the respective image correctly. The image display 102 and the left and right shutters 116, 118 are under the control of a binocular image controller 101 via respective control signals 103, 117, and 119.

In the first aspect of the instant invention, light from the image display 102 is simultaneously directed towards both eyes, and the respective shutters 116 and 118 regulate which eye views which sequential image. Accordingly, in a first embodiment of the first aspect of the system for which the beam splitters 106 and 108 are 50% reflective, and the fold-mirror 110 is 50% reflective, then about 12.5% of the light (10) from the image display 102 is transmitted through the second beam-splitter 106 (12), passes through the first beam splitter 108 (14), is reflected off of the fold-mirror 110 (16), and passes through the right shutter 118, passes through the right eye-lens 114, and into the right eye 4. Furthermore, about 12.5% of the light (10) from the image display 102 is transmitted through the second beam-splitter 106 (12), is reflected off the first beam splitter 108 (18), is reflected off of the second beam-splitter 106 (19), passes through the left shutter 116, passes through the left eye-lens 112, and into the left eye 2. Yet further, about 50% of the light (10) from the image display 102 is reflected off the second beam-splitter 106 (11) and is lost. Yet further, about 12.5% of the light (10) from the image display 102 is transmitted through the second beam-splitter 106 (12), passes through the first beam splitter 108 (14), passes through the fold-mirror 110 (15), and is lost. Finally, about 12.5% of the light (10) from the image display 102 is transmitted through the second beam-splitter 106 (12), is reflected off the first beam splitter 108 (18), transmitted through the second beam-splitter 106 (17), and is lost.

Referring to FIG. 2, illustrating an example of the operation of the first aspect of the instant invention for which a binocular image of an object—the letter "K"—is displayed, first and second sequential pluralities of image frames are temporally interleaved and sequentially displayed on the image display 102. The image frames of the second sequential plurality of image frames are mirror imaged with respect to the original object. The left shutter control signal 117, opening the left shutter 116, is activated whenever an image frame from the first sequential plurality of image frames is displayed on the image display 102, thereby enabling that image frame to be viewed from the left viewing location, i.e. by the left eye 2. The right shutter control signal 119 is activated, opening the right shutter 118, whenever an image frame from the second sequential plurality of image frames is displayed on the image display 102, thereby enabling that image frame to be viewed from the right viewing location, i.e. by the right eye 4. The left shutter control signal 117 is deactivated, closing the left shutter 116, whenever the right shutter control signal 119 is activated, and vice versa.

The first representative embodiment of the first aspect of the instant invention provides a compact binocular imaging system that does not incorporate a beam-splitting cube. This embodiment is further advantageous in that the optical path length from the image display 102 to each respective eye 2, 4 is the same, wherein the left and right eye-lenses 112, 114 are of the same design, and the images for the left and right eye 2, 4 do not require transformation as would otherwise be the case if the respective optical path lengths were not equal. However, as illustrated hereinabove, this embodiment significantly limits the light transmission efficiency of the system, whereby, for a system for which the reflectance of beam splitters 106 and 108, and fold-mirror 110 is 50%, at most about 12.5% of the light from the image display 102 is transmitted to either eye 2, 4 at any given time.

Figure 3:
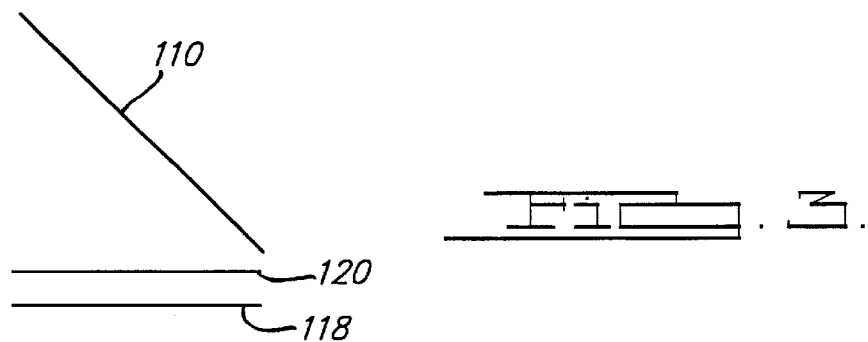
FIG. 3 illustrates an alternate embodiment of the instant invention.

Referring to FIG. 3, the fold-mirror 110 may be adapted for partial reflectivity either by using a partially reflective mirror, or by incorporating an attenuator 120 in series with the optical path of the fold-mirror 110.

The percentage of light from the image display reaching the viewing locations can be increased by modifying the reflectances of the beam splitters 106 and 108, and fold-mirror 110 from the exemplary levels illustrated above. If the reflectance of these elements is given respectively by $\alpha_{106}$, $\alpha_{108}$ and $\alpha_{110}$, then the fraction of light reaching the left and right viewing locations is given respectively by $(1-\alpha_{106}) \cdot \alpha_{108} \cdot \alpha_{106}$ and $(1-\alpha_{106}) \cdot (1-\alpha_{108}) \cdot \alpha_{110}$. Accordingly, under the constraint that these respective fractions be equal, by using a fully reflective fold-mirror 110, i.e. $\alpha_{110}=1$, and beam splitters 106 and 108 with respective reflectances of about $\alpha_{106}=0.41$ and $\alpha_{108}=0.71$, then the amount of light transmitted to each viewing location is increased to about 17.2%. Preferably, the reflectances $\alpha_{106}$, $\alpha_{108}$, $\alpha_{110}$ range as follows: $0.1 \leq \alpha_{106} \leq 0.8$, $0.4 \leq \alpha_{108} \leq 0.9$, $0.1 \leq \alpha_{110} \leq 1$.

Figure 4:
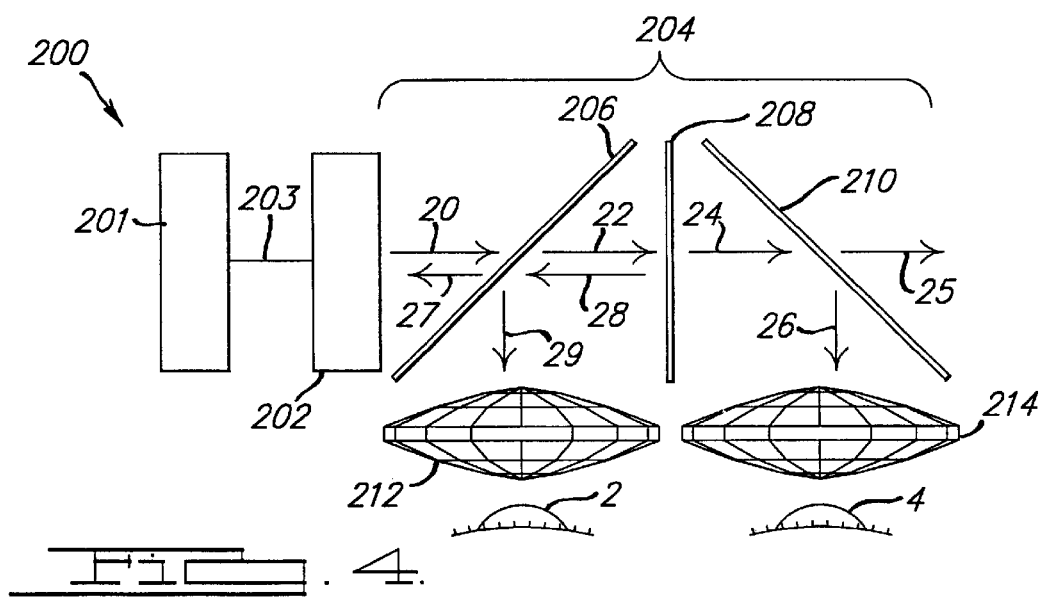
FIG. 4 illustrates a second aspect of the instant invention.

Referring to FIG. 4, a first representative embodiment of a second aspect of the instant invention providing increased light transmission efficiency, a compact binocular imaging system 200 comprises an image display 202 such as a conventional liquid crystal array further comprising a means for alternating the polarization state of the displayed image. The first flat beam-splitter 208 comprises a means of transmitting one polarization state and reflecting the orthogonal polarization state, for example a polarizing beam splitter. The second flat beam-splitter 206 is preferably a non-polarized beam splitter that reflects about 50% of the incident light, and transmits substantially all of the remaining light. Accordingly, a portion of the light passing through the second beam-splitter 206 in one polarization state is passed through the first beam-splitter 208 and reflected by the fold-mirror 210 into the right eye-lens 214. Moreover, a portion of the light passing through the second beam-splitter 206 in the orthogonal polarization state is reflected by the first beam-splitter 208 and then reflected by the second beam-splitter 206 into the left eye-lens 212. The left and right eye-lenses 212 and 214 are absent the shutters of the first aspect of the instant invention. The image display 202 is under the control of a binocular image controller 201 via a control signals 203.

The first representative embodiment of the second aspect of the instant invention operates by synchronizing the alternating polarization states of left and right images on the image display 202 and the passed polarization state of the first beam-splitter 206. The left eye image is displayed with a polarization state which passes through the second beam-splitter 206, reflects off the first beam-splitter 208 and then reflects off the second beam-splitter 206 to enter the left eye-lens 212. The right eye image is displayed with the opposite (orthogonal) polarization state that passes through both the second beam-splitter 206 and the first beam-splitter 208 to then reflect off the fold-mirror 210 into the right eye-lens 214. The light transmission efficiency of the second aspect of the instant invention is greater than that of the first because the second aspect of the instant invention employs fewer beam splitting elements that cause light loss. The first beam-splitter 208 transmits substantially all of the light of one polarization state, and reflects substantially all of the light of an orthogonal polarization state. Accordingly, the respective fractions of light that reach the left and right viewing locations—e.g. eyes 2, 4—is respectively given by $(1-\alpha_{206}) \cdot \alpha_{206}$ and $(1-\alpha_{206}) \cdot \alpha_{210}$, where $\alpha_R$ is the respective reflectance of element R. Accordingly, for equal fractions of light from the image display 202 to reach each respective viewing locations, then preferably $\alpha_{206}=\alpha_{210}=0.5$, so that both the second beam-splitter 206 and the fold-mirror 210 are preferably half-silvered mirrors 50% reflectivity, for which about 25% of the light from the image display 202 reaches the respective viewing locations. As described for the first aspect of the instant invention in conjunction with FIG. 3, the fold-mirror 210 may also be fully reflective provided that an attenuator is located in series with the associated optical path.

In the second aspect of the instant invention, light from the image display 202 is alternately directed towards each eye. Accordingly, in the first embodiment of the second aspect of the instant invention, when the binocular imaging system 200 is configured to display an image intended for the right eye 4, then about 25% of the light (20) from the image display 202 is transmitted through the second beam-splitter 206 (22), passes through the first beam splitter 208 (24), is reflected off of the fold-mirror 210 (26), passes through the right eye-lens 214, and into the right eye 4. Furthermore, when the binocular imaging system 200 is configured to display an image intended for the left eye 2, then about 25% of the light (20) from the image display 202 is transmitted through the second beam-splitter 206 (22), is reflected off the first beam splitter 208 (28), is reflected off of the second beam-splitter 206 (29), passes through the left eye-lens 212, and into the left eye 2. The remaining 50% of the light is lost (25), (27). Accordingly, the second aspect of the instant invention is more efficient than the first aspect of the instant invention. One of ordinary skill in the art will recognize that a portion of the light from the image display will be lost due to reflection and transmission losses of the associated non-ideal optical elements through which the light from the image display passes. Accordingly, the terms "substantially all" and "substantially none" as used herein, in conjunction with the light from the image display, refer to the light remaining after subtracting inherent losses associated with the non-ideal functioning of the associated optical system.

Figure 5:
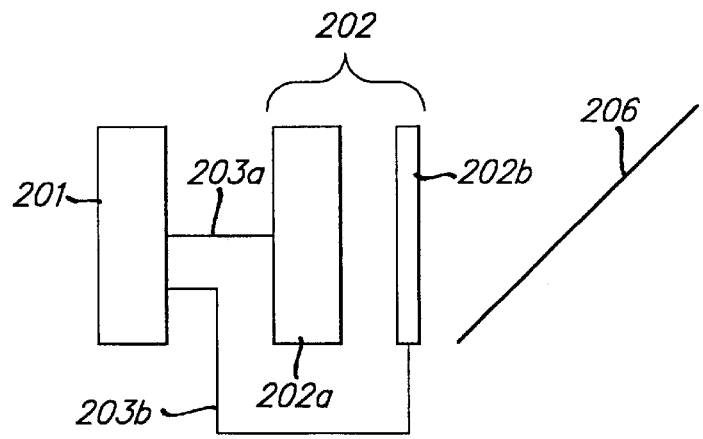
FIG. 5 illustrates an alternate embodiment of the second aspect of the instant invention.

Referring to FIG. 5, the image display 202 may comprise a linearly polarized image display 202a together with a controllable polarization rotator 202b, such as a controllable half-wave plate, wherein in a first control state, the controllable polarization rotator 202b does not rotate the polarization of incident light, whereas in a second control state, the controllable polarization rotator 202b rotates the polarization of the incident light by ninety (90) degrees. In accordance with this embodiment, the binocular image controller 201 provides both a first control signal 203a for controlling the image on the image display, for example to form mirror images of alternate image frames, and a second control signal 203b for controlling the polarization state of the controllable polarization rotator 202b.

The operation of the binocular imaging system 200 is similar to that illustrated in FIG. 2, except that instead of left and right shutter control signals 117, the binocular imaging system 200 provides a single polarization control signal, whereby one polarization state corresponds to the left shutter open/right shutter closed states illustrated in FIG. 2, and the other polarization state corresponds to the right shutter open/left shutter closed states illustrated in FIG. 2.

As with the first representative embodiment of the first aspect of the instant invention, in the first representative embodiment of the second aspect of the instant invention the left eye image on the display is reversed in left-right orientation with respect to the right eye image because the second beam-splitter 206 and fold-mirror 210 are orthogonal relative to one another rather than parallel to one another.

The individual components and means described in the exemplary embodiments herein are made in accordance with principles known to one skilled in the art. For example, display systems which can alternate the passed polarization state have been developed and demonstrated by Displaytech, Inc. in Colorado. Further, a flat polarizing beam splitter which reflects one polarization state while transmitting the orthogonal polarization state can be created using a variety of means. If the display and first beam-splitter operate with circular polarization, then the second beam-splitter may comprise a simple retarder (such as provided by Polaroid) combined with a reflective linear polarizer back layer (such as provided by 3M Optical Systems). If the display and first beam-splitter operate on linear polarization, then this back layer must be a reflective circular polarizer such as known to one skilled in the art of cholesteric liquid crystal layers.

One of ordinary skill in the art will appreciate that other arrangements of the compact beam splitter assemblies are possible without departing from the teachings of the instant invention.

One of ordinary skill in the art will further appreciate that while the exemplary embodiments herein illustrate the use of eye lenses to directly magnify the displayed image, an additional objective lens may be used to form an intermediate image of the display that is reimaged by the eye lenses into a virtual image. Moreover, the source of the image for the instant invention can be another imaging system that provides an intermediate image which propagates through the optical system, rather than a image display device such as an electronic image display.

One of ordinary skill in the art will yet further appreciate that the separate eye lenses can be incorporated into a single eye lens assembly or element. Moreover, whereas lenses have been illustrated as the preferred means for imaging the light from the image display, other types of focusing elements, for example either concave mirror elements or holographic optical elements, may be incorporated without departing from the teachings of the instant invention. Moreover, these alternate focussing elements may be incorporated into other optical elements of the system, thereby providing for combined functionality.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A binocular imaging system, comprising:
    (a) an image display, wherein said image display generates light representative of an image and said image comprises first and second sequential pluralities of image frames that are interleaved with one another in time;
    (b) a first focusing element along a first optical path, wherein said first optical path extends from said image display to a first location and said first focusing element focuses said image at said first location;
    (c) a second focusing element along a second optical path wherein said second optical path extends from said image display to a second location, said second focusing element focuses said image at said second location;
    (d) a selective display means having first and second display states, wherein in said first display state said selective display means causes said first sequential plurality of image frames to be displayed along said first optical path at said first location, and in said second display state said selective display means causes said second sequential plurality of image frames to be displayed along said second optical path at said second location;
    (e) a first beam splitter located along both said first and said second optical paths so as to distribute light incident thereupon between said first and said second optical paths, wherein a first portion of said incident light is reflected by said first beam splitter and propagates along said first optical path, and a second portion of said incident light is transmitted through said first beam splitter and propagates along said second optical path;
    (f) a second beam splitter located along both said first and said second optical paths between said image display and said first beam splitter, wherein at least a third portion of said light representative of an image is transmitted through said second beam splitter to said first beam splitter and a fourth portion of said first portion of said incident light reflected by said first beam splitter is reflected by said second beam splitter;
    (g) a reflector along said second optical path, wherein said reflector is adapted to reflect said second portion of said incident light that is transmitted through said first beam splitter; and
    (h) a controller operatively connected to said image display, wherein said image generated by said image display is responsive to said controller, said selective display means is responsive to said controller, said controller comprises first and second control states, in said first control state one of said first and second sequential pluralities of image frames is displayed by said image display and said selective display means operates in one of said first and second display states, in said second control state the other of said first and second sequential pluralities of image frames is displayed by said image display and said selective display means operates in the other of said first and second display states, and in one of said control states said controller causes each image of one of said first and second sequential pluralities of image frames to be displayed by said image display as a mirror image of a corresponding image signal.

2. A binocular imaging system as recited in claim 1, wherein in said second control state said controller causes said image display to generate a mirror image of each image of one of said second sequential plurality of image frames and said controller causes said selective display means to operate in said second display state.

3. A binocular imaging system as recited in claim 1, wherein said first location is adapted for viewing by one eye of a viewer and said second location is adapted for viewing by the other eye of said viewer.

4. A binocular imaging system as recited in claim 1, wherein a length of said first optical path is substantially equal to a length of said second optical path.

5. A binocular imaging system as recited in claim 1, wherein said second beam splitter has a reflectance that ranges from ten (10) to eighty (80) percent.

6. A binocular imaging system as recited in claim 1, wherein said reflector comprises a third beam splitter.

7. A binocular imaging system as recited in claim 6, wherein said third beam splitter has a reflectance that ranges from ten (10) to one hundred (100) percent.

8. A binocular imaging system as recited in claim 1, wherein said reflector comprises a mirror and said binocular imaging system further comprises an attenuator located in said second optical path.

9. A binocular imaging system as recited in claim 8, wherein said reflector and said attenuator together pass between ten (10) and one hundred (100) percent of light incident thereupon.

10. A binocular imaging system as recited in claim 1, wherein said first focusing element comprises a first lens and said second focusing element comprises a second lens.

11. A binocular imaging system as recited in claim 10, wherein said first and second lenses are of substantially the same design.

12. A binocular imaging system as recited in claim 1, wherein said each image frame of said first sequential plurality of image frames represents a first stereoscopic image component of an image of a three dimensional object, and each image frame of said second sequential plurality of image frames represents a second stereoscopic image component of an image of a three dimensional object, whereby said first and second stereoscopic image components provide for a three dimensional image of said three dimensional object.

13. A binocular imaging system as recited in claim 1, wherein said selective display means comprises:
(a) a first controllable shutter for controlling the passage of light along said first optical path wherein said first controllable shutter in a first control state allows the passage of light along said first optical path and said first controllable shutter in a second control state blocks the passage of light along said first optical path; and
(b) a second controllable shutter for controlling the passage of light along said second optical path wherein said second controllable shutter in said first control state blocks the passage of light along said second optical path and said second controllable shutter in said second control state allows the passage of light along said second optical path, wherein said controller controls said control states of said first and second controllable shutters, said first and second control states are mutually exclusive, and first and second control states are switched periodically in time in synchronism with said first and second sequential plurality of image frames.

14. A binocular imaging system as recited in claim 13, wherein said control states are switched periodically in time at a rate that is sufficiently fast to prevent an appearance of flicker.

15. A binocular imaging system as recited in claim 13, wherein said first beam splitter distributes between forty (40) and ninety (90) percent of said light to said first optical path and distributes substantially the remainder of said light to said second optical path.

16. A binocular imaging system as recited in claim 1, wherein said selective display means comprises a polarization control means, said polarization control means comprises first and second polarization control states, said polarization control means controls a polarization state of light from said image display, when said polarization control means is in a first polarization control state light from said image display is in a first polarization state, when said polarization control means is in a second polarization control state light from said image display is in a second polarization state, said first beam splitter comprises a polarizing beam splitter, said polarizing beam splitter transmits light of one of said first and second polarization states, said polarizing beam splitter reflects light of the other of said first and second polarization states controller controls said polarization control state, so that said light of said first sequential plurality of image frames is incident upon said first beam splitter in said first polarization state, and said light of said second sequential plurality of image frames is incident upon said first beam splitter in said second polarization state.

17. A binocular imaging system as recited in claim 16, wherein said polarization control means is incorporated in said image display, said light generated by said image display is in a first polarization state when said image display is in said first polarization control state, said light generated by said image display is in said second polarization state when said image display is in said second polarization control state.

18. A binocular imaging system as recited in claim 16, wherein said polarization control means comprises a controllable polarization rotator, wherein said controllable polarization rotator is located between said image display and said second beam splitter, said light generated by said image display after passing through said polarization rotator is in said first polarization state when said controllable polarization rotator is in said first polarization control state, said light generated by said image display after passing through said polarization rotator is in a second polarization state when said controllable polarization rotator is in said second polarization control state.

19. A binocular imaging system as recited in claim 18, wherein said controllable polarization rotator comprises a controllable half-wave plate.

20. A binocular imaging system as recited in claim 16, wherein said light generated by said image display is linearly polarized and said first and second polarization states are each linear in respective orthogonal directions.

21. A binocular imaging system as recited in claim 1, wherein said first and second focusing elements have substantially the same focal properties.

22. A method of creating a binocular image, comprising:
(a) generating a plurality of image frames representative of an image;
(b) selecting a first sequential plurality of image frames from said plurality of image frames;
(c) selecting a second sequential plurality of image frames from said plurality of image frames, wherein said first and second sequential pluralities of image frames are interleaved with one another in time;
(d) forming a third sequential plurality of image frames, wherein each frame of said third plurality of image frames is a mirror image of a corresponding image frame from said second plurality of image frames;
(e) generating light representative of said first and third sequential plurality of image frames on an image display;
(f) reflecting a portion of said light along one of a first and a second optical path;
(g) transmitting substantially all of the remaining portion of said light along the other of said first and second optical paths;
(h) reimaging the light of said first sequential plurality of images along one of said first and second optical paths;
(i) forming a mirror image of each image of said third sequential plurality of image frames; and (j) reimaging the light of said third sequential plurality of images along the other of said first and second optical paths.

23. A method of creating a binocular image as recited in claim 22, wherein said portion of said light reflected along said one of first and second optical paths is between forty (40) and ninety (90) percent, the step of reimaging said light of said first sequential plurality of images along said one of said first and second optical paths comprises passing said first sequential plurality of images along said one of said first and second optical paths and blocking said third sequential plurality of images along said one of said first and second optical paths; and the step of reimaging the light of said third sequential plurality of image frames comprises passing said third sequential plurality of images along said other of said first sequential plurality of images along said other of said first and second optical paths and blocking said first sequential plurality of images along said other of said first and second optical paths.

24. A method of creating a binocular image as recited in claim 22, further comprising:

(a) polarizing said light representative of said first sequential plurality of image frames in a first polarization direction; and (b) polarizing said light representative of said third sequential plurality of image frames in a second polarization direction; wherein said operation of reflecting a portion of said light comprises reflecting substantially all of said light having one of said first and second polarization directions.

\* \* \* \* \*